(12) United States Patent
Ogawa et al.

(10) Patent No.: US 8,312,963 B2
(45) Date of Patent: Nov. 20, 2012

(54) SOUND ABSORBING SKIN MATERIAL AND SOUND ABSORBING MATERIAL UTILIZING THE SAME

(75) Inventors: Masanori Ogawa, Tokai (JP); Makoto Fujii, Tokai (JP); Naohiro Mizutani, Tokai (JP)

(73) Assignee: Nagoya Oilchemical Co., Ltd, Aichi (JP)

( * ) Notice: Subject to any disclaimer, the term of this patent is extended or adjusted under 35 U.S.C. 154(b) by 0 days.

(21) Appl. No.: 12/866,784

(22) PCT Filed: May 23, 2008

(86) PCT No.: PCT/JP2008/059532
§ 371 (c)(1), (2), (4) Date: Aug. 9, 2010

(87) PCT Pub. No.: WO2009/101712
PCT Pub. Date: Aug. 20, 2009

(65) Prior Publication Data
US 2010/0320030 A1 Dec. 23, 2010

(30) Foreign Application Priority Data
Feb. 14, 2008 (JP) .................................. 2008-033432

(51) Int. Cl.
*E04B 1/82* (2006.01)

(52) U.S. Cl. ........................................................ 181/290

(58) Field of Classification Search .................. 181/210, 181/286, 290
See application file for complete search history.

(56) References Cited

U.S. PATENT DOCUMENTS

| | | | | |
|---|---|---|---|---|
| 4,131,702 | A * | 12/1978 | Alfter et al. ...................... | 428/76 |
| 4,150,186 | A * | 4/1979 | Kazama ......................... | 428/140 |
| 4,734,308 | A * | 3/1988 | Cline ............................. | 428/113 |
| 5,134,014 | A * | 7/1992 | Zaima et al. ................... | 428/186 |
| 5,503,903 | A * | 4/1996 | Bainbridge et al. ........... | 428/182 |
| 5,866,235 | A * | 2/1999 | Fredrick et al. ................ | 428/182 |
| 5,892,187 | A * | 4/1999 | Patrick ........................... | 181/286 |
| 6,253,995 | B1 * | 7/2001 | Blok et al. ..................... | 229/403 |
| 6,951,264 | B2 * | 10/2005 | Byma et al. .................... | 181/286 |

(Continued)

FOREIGN PATENT DOCUMENTS
JP 63-13004 4/1988

(Continued)

OTHER PUBLICATIONS
Translation of JP 5-43198.*

(Continued)

*Primary Examiner* — Jeremy Luks
(74) *Attorney, Agent, or Firm* — Cooper & Dunham LLP (57) ABSTRACT

A lightweight sound absorbing surface material, having an excellent sound absorbing property and moldability, and a sound absorbing material using the sound absorbing surface material, are provided in the present invention. The sound absorbing surface material 6 is manufactured by laminating stretchable paper(s) which is(are) creped and/or embossed (such as a creped paper $1b$) onto one or both sides of a fiber sheet 3. The degree of creping of the paper is in the range of between 10 and 50%, and the height of projections of the embossed paper is in the range of between 0.02 and 2.00 mm, with the number of the projections being in the range of between 20 and 200 projections/$cm^2$. Further, the sound absorbing surface material 6 is laminated onto a air permeable sheet of porous material 7, to manufacture a sound absorbing material 8.

16 Claims, 1 Drawing Sheet

U.S. PATENT DOCUMENTS

| | | | |
|---|---|---|---|
| 2004/0081797 A1* | 4/2004 | Simmons et al. | 428/137 |
| 2004/0166296 A1* | 8/2004 | Ragland et al. | 428/209 |
| 2005/0263346 A1* | 12/2005 | Nishimura | 181/290 |

FOREIGN PATENT DOCUMENTS

| | | |
|---|---|---|
| JP | 5-29547 | 4/1993 |
| JP | 5-43198 | 6/1993 |
| JP | 6-270362 | 9/1994 |
| JP | 9-41296 | 2/1997 |

OTHER PUBLICATIONS

Wikipedia page for Crepe Paper; http://en.wikipedia.org/wiki/Cr%C3%AApe_paper; accessed Dec. 21, 2011.*

* cited by examiner

SOUND ABSORBING SKIN MATERIAL AND SOUND ABSORBING MATERIAL UTILIZING THE SAME

FIELD OF THE INVENTION

The present invention relates to a sound absorbing surface material, and a sound absorbing material in which said sound absorbing surface material(s) is(are) used, said sound absorbing surface material or said sound absorbing material being usable for the floor mat of a car, the wall of a building, and the like.

BACKGROUND OF THE INVENTION

Recently, improving automobile fuel efficiency has become a matter of great urgency, considering the depletion of our oil resources, global warming, and the like. To improve automotive performance and meet with consumer demand, various measures have been taken to seriously improve soundproofing both on the inside and outside of a car, and many kinds of sound absorbing material have been provided for this purpose. Most of said sound absorbing materials are laminated materials, wherein a sound absorbing surface material is laminated onto a base sheet, after which the resulting green laminated material is molded into a predetermined shape.

Generally, a porous sheet such as a fiber sheet like a nonwoven fabric, a glass wool, a foamed polyurethane sheet or the like has been used as a surface material. Further, it is known that the ventilation resistance of the surface material must be adjusted to be in the range of between about 0.6 and 20.0 kPa·s/m, to ensure the maximum performance of the sound absorption and insulation over a wide frequency range.

For instance, Patent Literature 1 discloses a sound absorbing felt made of a single felt layer. Patent Literature 2 discloses a car interior made of a fiber web containing a synthetic resin binder. Further Patent Literature 3 discloses a car insulator made of a laminated material consisting of a sound absorbing fiber layer and foamed surface material.

Patent Literature 1: Tokkai 2005-195989
Patent Literature 2: Tokkai 2004-325973
Patent Literature 3: Tokkai 2003-081028

DISCLOSURE OF THE INVENTION

Problems to be Solved by the Invention

Nevertheless the above described prior arts have the following defects.

For instance, the sound absorbing material used in a car or building wall material is attached onto the floor or wall without adequate clearance to ensure its sound absorbing performance, so that in a case where said sound absorbing material is composed of only a fiber sheet or a porous material, the weight of said sound absorbing material should be fairly substantial. As a result, the workability of said sound absorbing material deteriorates because of the heavy weight of said sound absorbing material, and especially in a case where said sound absorbing material is used in a car, a heavy sound absorbing material is unfavorable for fuel economy and the overall lightening of the car body. Further, in a case where said paper is used as the sound absorbing material to reduce the weight, the problem of its sound absorbing performance arises, and moreover, leading to fears that its moldability and durability for forcibly fitting, and the like may be inferior. Concretely, the invention disclosed in Patent Literature 1 is characterized by successively changing the air flow resistance value from one side surface of the felt to the other by the amount of the binding resin used for coating, but the resulting structure in Patent Literature 1 present a problem in that it becomes heavier, such as 1500 g/m$^2$. Further, the interior provided by the invention disclosed in Patent Literature 2 also becomes heavier such as 1750 g/m$^2$. Still further, the interior provided by the invention disclosed in Patent Literature 3 is lightweight, but since the surface layer is a foamed layer, the problem arises that the interior is weak.

Accordingly the object of the present invention is to solve the aforementioned problems of the prior art, so that the present invention provides a sound absorbing surface material which allows for a lightweight product having good sound absorbing performance and good moldability, that is usable for many applications. Further, the present invention also provides a sound absorbing material in which said sound absorbing surface material is used.

The Means to Solve the Problems

To solve the problems of the prior art, the present invention provides a sound absorbing surface material characterized by laminating stretchable paper(s) having an uneven surface, onto one or both sides of a fiber sheet. Further, the present invention provides a sound absorbing surface material characterized by laminating stretchable paper(s) which is (are) creped, onto one or both sides of a fiber sheet. Still further, the present invention provides a sound absorbing surface material characterized by laminating stretchable paper(s), which is (are) embossed, onto one or both sides of a fiber sheet. The present invention provides a sound absorbing surface material characterized by laminating stretchable paper(s) which is (are) creped and embossed, onto on one or both sides of a fiber sheet. Said creped, or creped and embossed stretchable paper, preferably has a degree of creping in the range of between 10 and 50%, and further, said embossed, or creped and embossed stretchable paper, preferably has projections having the height in the range of between 0.02 and 2.00 mm, with the number of the projections preferably being in the range of between 20 and 200 projections/cm$^2$. The unit weight of said stretchable paper is preferably in the range of between 10 and 50 g/m$^2$, and said stretchable paper(s) is (are) preferably laminated onto said fiber sheet through porous adhesive layer(s). If desired, a synthetic resin may be coated on and/or impregnated in to said fiber sheet and/or said stretchable paper. The ventilation resistance of said stretchable paper is preferably adjusted so as to be higher than at least 0.060 kPa·s/m, and the ventilation resistance of said sound absorbing surface material, which is appropriately set accordingly to required frequency, is preferably adjusted so as to be in the range of between 0.100 and 1.000 kPa·s/m. Further, the present invention provides a sound absorbing material in which said sound absorbing surface material is laminated onto an air permeable porous material sheet. If desired, a synthetic resin may be coated on or impregnated in to at least any of said fiber sheet, stretchable paper, or air permeable porous material sheet. The ventilation resistance of said sound absorbing material, which is appropriately set according to required frequency, is preferably adjusted in the range of between 0.400 and 20.000 kPa·s/m. If desired, said sound absorbing material may be molded into a predetermined shape.

Effect of the Invention

[Action]

In said sound absorbing surface material of the present invention, a favorable sound absorbing performance is demonstrated through the cooperation between the sound absorbing effects of said fiber sheet and unevenly surfaced stretchable paper. For instance, when comparing said sound absorbing surface material of the present invention with another sheet (such as a sheet of paper having an even surface) having the same ventilation resistance as said sound absorbing surface material of the present invention, said sound absorbing surface material has a remarkably excellent sound absorbing performance. Further, since in said sound absorbing surface material, the thickness can be reduced while maintaining its sound absorbing performance, said sound absorbing surface material is of a lighter weight than a conventional sound absorbing surface material, so that a lightweight car interior can be realized. Further, by adjusting the degree of creping, or the height of projections of said stretchable paper in the aforementioned range, the extension property of said stretchable paper can be improved, thus improving the moldability of said sound absorbing surface material, making it moldable into any concave, convex, or curved shape, or the like, and with improved durability for force-fitting. Accordingly, said sound absorbing surface material is favorably used for the floors, walls and the like of a car or building. Further, in a case where a synthetic resin is coated on and/or impregnated in to said fiber sheet and/or stretchable paper, the water resistance, strength, durability and the like of said sound absorbing surface material will be improved. Still further, said sound absorbing material in which said sound absorbing surface material is used can be molded into a predetermined shape according to the purpose.

[Effect]

Said sound absorbing surface material and sound absorbing material have a structure wherein said stretchable paper is laminated onto said fiber sheet so that said sound absorbing surface material and said sound absorbing material can be lightened while maintaining a favorable sound absorbing performance, and since said sound absorbing surface material and sound absorbing material have good moldability, they can be used in various applications.

EXPLANATION OF CODES

1a. Embossed paper (Stretchable paper)
1b. Creped paper (Stretchable paper)
2. Projection
3. Fiber sheet
5a, 5b. Porous adhesive layer
6. Sound absorbing surface material
7. Air permeable porous material
8. Sound absorbing material
R. Ventilation resistance

BEST MODE FOR CARRYING OUT THE INVENTION

The present invention is described in details below.

[Fiber Sheet]

The fiber material used for the fiber sheet of the present invention includes a synthetic fiber such as polyester fiber, polyethylene fiber, polypropylene fiber, polyamide fiber, acrylic fiber, urethane fiber, polyvinyl chloride fiber, polyvinylidene chloride fiber, acetate fiber, or the like, a biodegradable fiber made of starch extract from a plant such as corn, sugarcane, or the like, a natural fiber such as pulp, cotton, palm fiber, hemp fiber, bamboo fiber, kenaf fiber, or the like, an inorganic fiber such as glass fiber, carbon fiber, ceramic fiber, asbestos fiber, or the like, a reclaimed fiber obtained by the defibrating of the scrap of the fiber product made of said fiber, or the like, and said fiber is used singly or two or more kinds of fiber may used in said fiber aggregate, and in a case where the heat resistant synthetic fiber having a high temperature melting point preferably higher than 250° C., like an inorganic fiber such as glass fiber, carbon fiber, ceramic fiber, asbestos fiber, stainless fiber, or the like, an aramid fiber such as poly (m-phenylene isophthalamide) fiber, poly (p-phenylene terephthalamide) fiber, or the like, a polyarylate fiber, polyetheretherketone fiber, polyphenylene sulfide, or the like is (are) used, a sound absorbing surface material having an extremely high heat resistance can be provided. In said highly heat resistant fiber, the carbon fiber is especially useful, since used or scrapped carbon fiber can be treated by incineration, and further, the fragments of the carbon fiber don't fly around, and aramid fiber is also an especially useful fiber, since it is comparatively inexpensive and easily available.

Further, in said fiber sheet, a thermoplastic fiber having a low melting point of below 180° C. may be used partially or wholly as said fiber.

Said thermoplastic fiber having a low melting point of below 180° C. includes such as polyolefin group fibers like polyethylene, polypropylene, ethylene-vinyl acetate copolymer, ethylene-ethyl acrylate copolymer, or the like, polyvinyl chloride fiber, polyurethane fiber, polyester fiber, copolymerized polyester fiber, polyamide fiber, copolymerized polyamide fiber, or the like. Said low melting point thermoplastic fiber may be used singly, or two or more kinds of said low melting point thermoplastic fiber may be used together. The fineness of said low melting point thermoplastic fiber is preferably in the range of between 0.1 and 60 dtex. In the present invention, a core-sheath type composite fiber is preferably used, wherein an ordinary fiber is the core component, and a thermoplastic resin having a low melting point in the range of between 100 and 180° C. is the sheath component. In a case where said core-sheath type composite fiber is used as the fiber for said fiber sheet, the rigidity and heat resistance of said fiber sheet do not degrade.

Said fiber sheet is manufactured by various methods such as the method, wherein a sheet or mat of said fiber web is needle-punched to entangle the fibers in said sheet or mat together, the spun bond method, or the thermal bond method, wherein, in a case where said sheet or mat of said fiber web consists of said low melting point thermoplastic fiber, or said low melting point thermoplastic fiber is mixed into said web, said sheet or mat is heated to soften said low melting point thermoplastic fiber and bind said fibers together by melting them, or the chemical bond method wherein a synthetic resin binder is impregnated or mixed into said fiber web to bind said fibers together with said synthetic resin binder, or the method wherein said sheet or mat of said fiber web is needle punched to entangle said fibers in said sheet or mat together, following which said low melting point thermoplastic fiber is heated and softened to bind said fibers together, or the stitch bond method wherein, said sheet or mat is sewed with string, the spun lace method wherein said web is twined using a high-pressure water current, or the method wherein said synthetic resin binder is impregnated into the resulting needle-punched sheet or mat, to bind said fibers, or the method wherein said fiber is knitted or woven, or the like.

The unit weight and thickness of said fiber sheet of the present invention can be optionally set as a rule, the desirable unit weight being set to be in the range of between 10 and 200 g/m$^2$, with a thickness set to be in the range of between 0.01 and 10 mm.

[Stretchable Paper]

As said stretchable paper used in the present invention, a creped paper on the surface of which crepe like wrinkles (wrinkles that are uneven) are formed, an embossed paper on the surface of which a number of projections are formed, and a creped and embossed paper on the surface of which crepe like wrinkles and a number of projections are formed, and the like, are illustrated.

Said creped paper is manufactured by processing crepes on a green paper. Said crepe processing includes the wet creping process, wherein wet paper is compressed longitudinally (along the papering direction) with a press roll, doctor blade, or the like, for wrinkling, and the dry creping process wherein the green paper is dried with a Yankee drier or calendar, after which the resulting dried green paper is compressed longitudinally with a doctor blade or the like, for wrinkling. For instance, the degree of creping of said stretchable paper, which is the creped paper, is preferably in the range of between 10 and 50%.

Herein said degree of creping is defined by the following formula.

$$\text{Degree of creping (\%)} = (A/B) \times 100$$

wherein A is the papering speed in the papering process, and B is the rolling speed of the paper.

In other words, said degree of creping is the longitudinal (along the papering direction) degree of compression of the green paper (paper web) (See Tokkai 2002-327399, Tokuhyouhei 10-510886).

In a case where the degree of creping is below 10%, the sound absorbing performance of said creped paper (stretchable paper) will decline and the stretchability of said creped paper will become inadequate so that said creped paper having a degree of creping below 10% is apt to wrinkle during molding. On the other hand, said creped paper having a degree of creping beyond 50% is also apt to wrinkle during molding.

Figure 2:
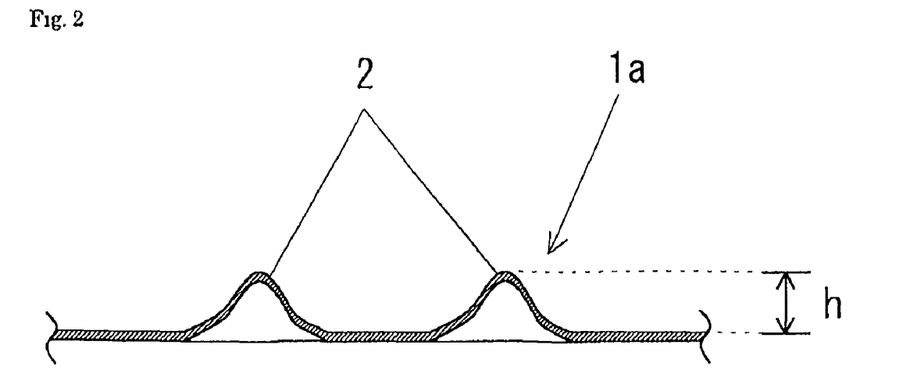
FIG. 2 illustrates the height of projections h.

Said embossed paper is manufactured by pressing an embossing roll or plate having an uneven surface which is formed by carving or etching (embossing roll, embossing plate) onto the green paper to form a number of projections on the surface of said green paper, the height of said projections, preferably being in the range of between 0.02 and 2.00 mm, and the number of said projections preferably being in the range of between 20 and 200 projections/cm$^2$. In a case where the height of said projections is below 0.02 mm, the sound absorbing performance of said embossed paper (stretchable paper) will decline, and the stretchability of said embossed paper will become inadequate, so that said embossed paper having projections the height of which is below 0.02 mm is apt to wrinkle during molding. On the other hand, said embossed paper having projections the height of which is beyond 2.00 mm is also apt to wrinkle during molding. In a case where the number of projections is below 20 projections/cm$^2$, the sound absorbing performance of said embossed paper (stretchable paper) will decline, and the stretchability of said embossed paper will become inadequate, so that said embossed paper in which the number of projections is below 20 projections/cm$^2$, is apt to wrinkle during molding. On the other hand, in a case where the number of projections is beyond 200 projections/cm$^2$, the sound absorbing performance of said embossed paper (stretchable paper) will decline. In FIG. 2, a number of projections 2 are formed on the surface of said embossed paper 1$a$ (stretchable paper) and the height of said projections is expressed as "h" in FIG. 2.

Further, in the embossing processing, said creped paper is used as the green paper to obtain said embossed and creped paper.

As the pulp used for the material of said creped paper, embossed paper, and the like, for instance, broadleaf tree wood pulp, conifer wood pulp, hemp pulp, kenaf pulp, bamboo pulp, esparto pulp, bagasse pulp, reed pulp, or the like are included. Besides said natural pulp such as said wood pulp and non wood pulp, a synthetic fiber may be used together with said natural pulp, with the amount of said synthetic fiber to be mixed preferably being in the range of between about 40 and 50% by mass.

The unit weight of said stretchable paper is preferably set to be in the range of between 10 and 50 g/m$^2$. In a case where the unit weight is below 10 g/m$^2$, the resulting sound absorbing surface material will have inferior moldability and wrinkles are apt to be formed during molding, leading said sound absorbing surface material to an inferior sound absorbing performance. On the other hand, in a case where the unit weight is beyond 50 g/m$^2$, the weight of the resulting sound absorbing surface material increases, and its moldability deteriorates.

Figure 1:
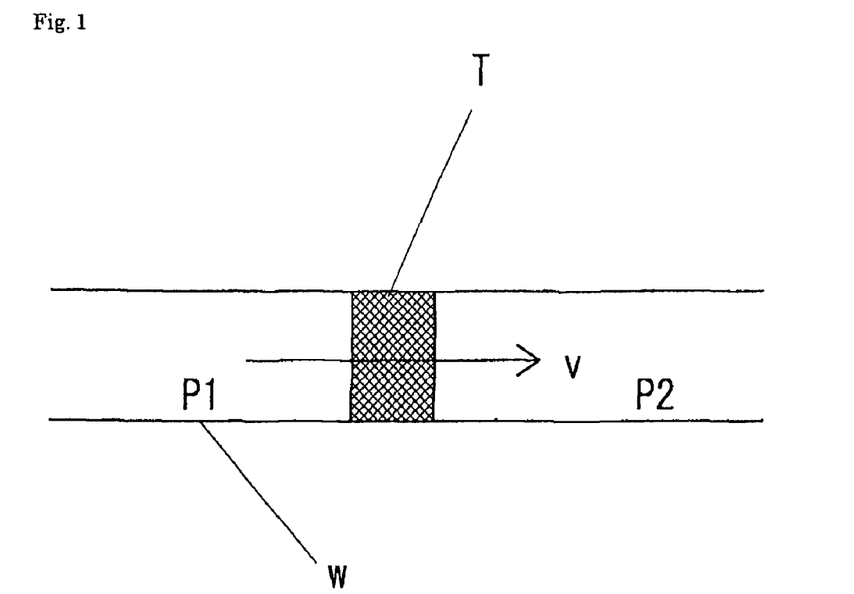
FIG. 1 illustrates the method of measurement for the ventilation resistance R.

The ventilation resistance of said stretchable paper is preferably set to be higher than at least 0.060 kPa·s/m. Said ventilation resistance R (Pa·s/m) is a barometer expressing the degree of ventilation of air permeable material. To measure said ventilation resistance R, the steady flow differential-pressure measuring method may be applied. As shown in FIG. 1, a test piece T is arranged in a cylindrical duct W, and air is put into said duct at a constant flow V as shown by the arrow, to measure the difference in pressure in said duct between inlet side P1, and outlet side P2. The ventilation resistance is calculated by the following formula.

$$R = \Delta P/V$$

Wherein $\Delta P$ is the difference in pressure Pa($\Delta P = P1 - P2$), and V represents the volume of air flow for said unit cross section area of said duct (m$^3$/m$^2$·S).

Said ventilation resistance can be measured with such as the ventilation tester (Trade Name: KES-F8-AP1, KATO TECH CO., LTD. The steady flow differential pressure measuring method).

Further, the ventilation resistance of said stretchable paper of the present invention is set according to the frequency of the sound being effected on the final product. The ventilation resistance can be adjusted by the entanglement of fibers together in said stretchable paper, the unit weight of said stretchable paper, and the amount of the synthetic resin which is coated on and/or impregnated into said stretchable paper.

[Air Permeable Porous Material]

As said air permeable porous material used in the present invention, besides the same kinds of the fiber sheet as aforementioned, a fiber sheet such as nonwoven fabric, knit or woven fabric, or the like, air permeable foamed resin such as air permeable foamed polyurethane, air permeable foamed polyethylene, air permeable foamed polypropylene, air permeable foamed polystyrene, air permeable foamed polyvinyl chloride, air permeable foamed epoxy resin, air permeable foamed melamine resin, air permeable foamed urea resin, air permeable foamed phenol resin, or the like, and sintered plastic bead, or the like are included.

[Sound Absorbing Surface Material and Sound Absorbing Material]

Figure 3:
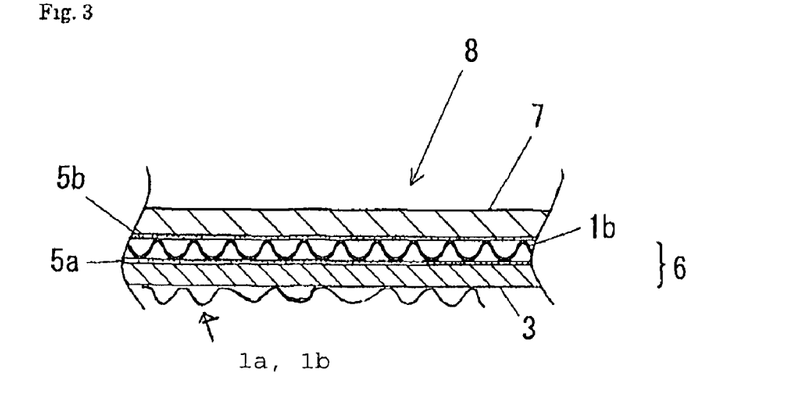
FIG. 3 is a vertical sectional view of said sound absorbing material 8.

In a case where said fiber sheet and stretchable paper are laminated together to manufacture said sound absorbing surface material, or in a case where the resulting sound absorbing surface material and said air permeable porous material are laminated together to manufacture said sound absorbing material (See FIG. 3), an ordinary solution type or aqueous emulsion type adhesive, solution type hot melt adhesive, aqueous emulsion type hot melt adhesive, powder type hot melt adhesive, cobweb type hot melt adhesive, or the like are used. In a case where said powder type hot melt adhesive, or cobweb type hot melt adhesive is used, the air permeable porous adhesive layer is formed between said fiber sheet and said stretchable paper, or said sound absorbing surface material and said air permeable porous material, so that the air permeability of the resulting laminated material is secured, and not suffocated by the adhesive layer. For instance, it is illustrated in FIG. 3 that a fiber sheet 3 and a creped paper 1b (stretchable paper) are laminated together through an air permeable porous adhesive layer 5a to manufacture a sound absorbing surface material 6, and that further the resulting sound absorbing surface material 6 consisting of said fiber sheet 3 and said creped paper 1b, and a felt 7 (an air permeable porous material) are laminated together through an air permeable porous adhesive layer 5b, to manufacture a sound absorbing material 8.

In a case where said solution type adhesive or said aqueous emulsion type adhesive is used, it is preferable that said adhesive is coated by spraying, silkscreen printing, offset printing, or the like, so as to form a dotted adhesive layer to secure the air permeability of the resulting laminated material.

The ventilation resistance of said sound absorbing surface material is preferably set to be in the range of between 0.100 and 1.000 kPa·s/m. In a case where the ventilation resistance of said sound absorbing surface material is beyond 1.000 kPa·s/m, the moldability of said sound absorbing surface material will decline.

The ventilation resistance of said sound absorbing material is preferably set to be in the range of between 0.400 and 20.000 kPa·s/m. In a case where the ventilation resistance of said sound absorbing material is below 0.400 kPa·s/m, the sound absorbing performance of said sound absorbing material will decline, and in a case where the ventilation resistance of said sound absorbing material is beyond 20.000 kPa·s/m, the sound insulating property becomes dominant over the sound absorbing property.

Further, the ventilation resistance of said stretchable paper is adjusted considering the sound frequency effected on the end product. Said ventilation resistance can be adjusted by the entanglement of fibers together in said stretchable paper, the unit weight of said stretchable paper, and amount of resin coated on and/or impregnated in to said stretchable paper. In a case where said resin coated on and/or impregnated in to said stretchable paper has adhesive ability, the use of the additional adhesive for lamination is not always necessary.

[Synthetic Resin]

In said sound absorbing surface material and sound absorbing material, a synthetic resin may be coated on and/or impregnated in to at least any of said fiber sheet, stretchable paper, or air permeable porous material. For instance, said synthetic resin is thermoplastic resin and/or thermosetting resin.

Said thermoplastic resin is, for instance, an acrylate resin, methacrylate resin, ionomer resin, ethylene-ethyl acrylate (EEA) resin, copolymerized acrylonitrile-styrene-acrylic rubber (ASA) resin, copolymerized acrylonitrile-styrene (AS) resin, copolymerized acrylonitrile-chlorinated polyethylene-styrene (ACS) resin, copolymerized ethylene-vinyl acetate (EVA) resin, copolymerized ethylene-vinyl alcohol (EVOH) resin, polymethylmethacrylate resin (PMMA), polybutadiene (BDR), polystyrene (PS), polyethylene (PE), copolymerized acrylonitrile-butadiene-styrene (ABS) resin, chlorinated polyethylene (CPE), polyvinyl chloride (PVC), polyvinylidene chloride (PVDC), polypropylene (PP), cellulose acetate (CA) resin, syndiotactic polystyrene (SPS), polyoxymethylene (=polyacetal) (POM), polyamide (PA), polyimide (PI), polyamide imide (PAI), polyether imide (PEI), polyarylate (PAR), thermoplastic polyurethane (TPU) elastomer, thermoplastic elastomer (TPE), liquid crystal polymer (LCP), polyether ether ketone (PEEK), polysulfone (PSF), polyether sulfone (PES), fluorocarbon polymer, polytetrafluoroethylene (PTFE), polyethylene terephthalate (PET), polycarbonate (PC), polyphenylene ether (PPE), modified PPE, polyphenylene sulfide (PPS), polybutylene terephthalate (PBT), polybenzimidazole (PBI), wholly aromatic polyester (POB), or the like. Said thermoplastic resin provides a thermoplastic sheet having an excellent retention of the molded shape, and good rigidity when said thermoplastic resin is impregnated in or coated on to said fiber sheet, stretchable paper, or air permeable porous material.

Two or more kinds of said thermoplastic resin may be mixed and used together, and one or more kinds of thermosetting resin may be used together with said thermoplastic resin in a small amount so as not to hinder the thermoplasticity of said thermoplastic resin. Said thermoplastic resin is preferably provided as an aqueous solution, aqueous emulsion, or aqueous dispersion for handling, or procedures such as impregnating, coating or the like, and that may be provided as an organic solvent solution.

Said thermosetting resin may be such as a urethane resin, melamine resin, thermosetting acrylic resin, especially thermosetting acrylic resin which is formed into an ester bond and stiffened by heating, a urea resin, phenol resin, epoxy resin, thermosetting polyester, or the like, and further a synthetic resin precursor utilized to produce said synthetic resin may be also used. Said synthetic resin precursor may include such as a prepolymer, oligomer, and monomer such as urethane resin prepolymer, urea resin prepolymer (precondensation polymer), phenol group resin prepolymer (precondensation polymer), diallyl phthalate prepolymer, acrylic oligomer, polyatomic isocyanate, methacrylic ester monomer, diallyl phthalate monomer, or the like. For easy handling, said thermosetting resin is preferably provided as an aqueous solution, aqueous emulsion, or aqueous dispersion, and may also be provided as an organic solvent solution.

The addition of said synthetic resin, especially said thermosetting resin, improves the retention of the molded shape, and rigidity of said fiber sheet, stretchable paper, and air permeable porous material.

A phenol group resin is an especially preferable synthetic resin in the present invention.

Said phenol group resin is produced by the condensation of a phenol group compound, and formaldehyde and/or a formaldehyde donor.

(Phenol Group Compound)

The phenol group compound used to produce said phenol group resin may be a monohydric phenol, or polyhydric phenol, or a mixture of monohydric phenol and polyhydric phenol, but in a case where only a monohydric phenol is used, formaldehyde is apt to be emitted when or after said resin composition is cured, making polyphenol or a mixture of monophenol and polyphenol most desirable.

(Monohydric Phenol)

The monohydric phenols include an alkyl phenol such as o-cresol, m-cresol, p-cresol, ethylphenol, isopropylphenol, xylenol, 3,5-xylenol, butylphenol, t-butylphenol, nonylphenol or the like; a monohydric derivative such as o-fluorophenol, m-fluorophenol, p-fluorophenol, o-chlorophenol, m-chlorophenol, p-chlorophenol, o-bromophenol, m-bromophenol, p-bromophenol, o-iodophenol, m-iodophenol, p-iodophenol, o-aminophenol, m-aminophenol, p-aminophenol, o-nitrophenol, m-nitrophenol, p-nitrophenol, 2,4-dinitrophenol, 2,4,6-trinitrophenol or the like; a monohydric phenol of a polycyclic aromatic compound such as naphthol or the like. Each monohydric phenol can be used singly, or as a mixture thereof.

(Polyhydric Phenol)

The polyhydric phenols mentioned above include resorcin, alkylresorcin, pyrogallol, catechol, alkyl catechol, hydroquinone, alkyl hydroquinone, phloroglucinol, bisphenol, dihydroxynaphthalene or the like. Each polyhydric phenol can be used singly, or as a mixture thereof. Resorcin and alkylresorcin are more suitable than other polyhydric phenols. Alkylresorcin, in particular, is the most suitable of polyhydric phenols because alkylresorcin can react with aldehydes more rapidly than resorcin.

The alkylresorcins include 5-methyl resorcin, 5-ethyl resorcin, 5-propyl resorcin, 5-n-butyl resorcin, 4,5-dimethyl resorcin, 2,5-dimethyl resorcin, 4,5-diethyl resorcin, 2,5-diethyl resorcin, 4,5-dipropyl resorcin, 2,5-dipropyl resorcin, 4-methyl-5-ethyl resorcin, 2-methyl-5-ethyl resorcin, 2-methyl-5-propyl resorcin, 2,4,5-trimethyl resorcin, 2,4,5-triethyl resorcin, or the like.

A polyhydric phenol mixture produced by the dry distillation of oil shale, which is produced in Estonia, is inexpensive, and includes 5-metyl resorcin, along with many other kinds of alkylresorcin which is highly reactive, so that said polyhydric phenol mixture is an especially desirable raw polyphenol material for the present invention.

Further, among said polyhydric phenols, one or a mixture of two or more kinds of resorcin group compound such as resorcin, alkylresorcin or the like (including a polyhydric phenol mixture produced by the dry distillation of oil shale which is produced in Estonia), and a resorcin group resin consisting of aldehyde and/or an aldehyde donor, are desirably used as a phenol group resin in the present invention.

[Formaldehyde Donor]

In the present invention, said phenol group compound and formaldehyde and/or formaldehyde donor are condensed together. Said formaldehyde donor refers to a compound or a mixture thereof which emits aldehyde when said compound or said mixture decomposes. Said aldehyde donor is such as paraformaldehyde, trioxane, hexamethylenetetramine, tetraoxymethylene, or the like. In the present invention, a formaldehyde and formaldehyde donor are combined together, hereafter to be described as a formaldehyde group compound.

[Production of Phenol Group Resin]

There are two types of said phenol group resin, one is a resol type, which is produced by the reaction between said phenol group compound and an excess amount of said formaldehyde group compound using an alkali as a catalyst, and the other novolak type is produced by the reaction between an excess amount of said phenol group compound and said formaldehyde group compound using an acid as a catalyst. Said resol type phenol group resin consists of various phenol alcohols produced by the addition of formaldehyde to phenol, and is commonly provided as a water solution, while said novolak phenol group resin consists of various dihydroxydiphenylmethane group derivatives, wherein said phenol group compounds are further condensed with phenol alcohols, said novolak type phenol group resin commonly being provided as a powder.

As for the use of said phenol group resin in the present invention, said phenol group compound is first condensed with a formaldehyde group compound to produce a precondensate, after which the resulting precondensate is applied to said fiber sheet, which is followed by resinification with a curing agent, and/or by heating.

To produce said condensate, monohydric phenol may be condensed with a formaldehyde group compound to produce a homoprecondensate, or a mixture of monohydric phenol and polyhydric phenol may be condensed with a formaldehyde group compound to produce a coprecondensate of monohydric phenol and polyhydric phenol. To produce said coprecondensate, either of said monohydric phenol or polyhydric phenol may be previously condensed with said formaldehyde group compound to produce a precondensate, or both monohydric phenol and polyhydric phenol may be condensed together.

In the present invention, the desirable phenol group resin is a phenol-alkylresorcin cocondensation polymer. Said phenol-alkylresorcin cocondensation polymer provides a water solution of said cocondensation polymer(pre-cocondensation polymer) having good stability, and being advantageous in that it can be stored for a longer time at room temperature, compared with a condensate consisting of only a phenol (precondensation polymer). Further, in a case where said sheet material is impregnated or coated with said water solution, and then precured, said material has good stability and does not lose its moldability after longtime storage. Further, since alkylresorcin is highly reactive to a formaldehyde group compound, and catches free aldehydes to react with them, the content of free aldehydes in the resin can be reduced.

The desirable method for producing said phenol-alkylresorcin cocondensation polymer is first to create a reaction between phenol and a formaldehyde group compound to produce a phenol group resin precondensate, and then to add alkylresorcin, and if desired, a formaldehyde group compound, to said phenol group resin precondensate, to create a reaction.

In the case of method (a), for the condensation of monohydric phenol and/or polyhydric phenol and a formaldehyde group compound, said formaldehyde group compound 0.2 to 3 moles is added to said monohydric phenol 1 mole, after which said formaldehyde group compound 0.1 to 0.8 mole is added to the polyhydric phenol 1 mole as usual. If necessary, additives may be added to the phenol resins (the precondensation polymers). In said method(s), there is a condensation reaction caused by applying heat at 55° C. to 100° C. for 8 to 20 hours. The addition of said formaldehyde group compound may be made at once at the beginning of the reaction, or several separate times throughout the reaction, or said formaldehyde group compound may be dropped in continuously throughout said reaction.

Further, if desired, the phenol group compounds and/or precondensates thereof may be copolycondensed with amino resin monomers such as urea, thiourea, melamine, thiomelamine, dicyandiamine, guanidine, guanamine, acetoguanamine, benzoguanamine, 2,6-diamino-1.3-diamine, and/or with the precondensation polymers of said amino resin monomers, thus producing said phenol group resins.

To produce said phenol group resin, a catalyst or a pH control agent may be mixed in, if needed, before, during or after the reaction. Said catalyst or pH control agent is, for example, an organic or inorganic acid such as hydrochloric acid, sulfuric acid, orthophosphoric acid, boric acid, oxalic acid, formic acid, acetic acid, butyric acid, benzenesulfonic acid, phenolsulfonic acid, p-toluenesulfonic acid, naphthalene-α-sulfonic acid, naphthalene-β-sulfonic acid, or the like; an organic acid ester such as oxalic dimethyl ester, or the like; an acid anhydride such as maleic anhydride, phthalic anhydride, or the like; an ammonium salt such as ammonium chloride, ammonium sulfate, ammonium nitrate, ammonium oxalate, ammonium acetate, ammonium phosphate, ammonium thiocyanate, ammonium imide sulfonate, or the like; an organic halide such as monochloroacetic acid or its sodium salt, α,α'-dichlorohydrin, or the like; a hydrochloride of amines such as triethanolamine hydrochloride, aniline hydrochloride, or the like; a urea adduct such as salicylic acid urea adduct, stearic acid urea adduct, heptanoic acid urea adduct, or the like; an acid substance such as N-trimethyl taurine, zinc chloride, ferric chloride, or the like; ammonia; amines; an hydroxide of an alkaline metal or alkaline earth metal such as sodium hydroxide, potassium hydroxide, barium hydroxide, calcium hydroxide, or the like; an oxide of an alkalineearth metal such as lime, or the like; an alkaline substance like an alkalinemetal salt of weak acid such as sodium carbonate, sodium sulfite, sodium acetate, sodium phosphate or the like.

Further, curing agents such as a formaldehyde group compound or an alkylol triazone derivative, or the like, may be added to said phenol group resin precondensate (including precocondensation polymer).

Said alkylol triazone derivative is produced by the reaction between the urea group compound, amine group compound, and formaldehyde group compound. Said urea group compound used in the production of said alkylol triazone derivative may be such as urea, thiourea, an alkylurea such as methylurea or the like; an alkylthiourea such as methylthiourea or the like; phenylurea, naphthylurea, halogenated phenylurea, nitrated alkylurea, or the like, or a mixture of two or more kinds of said urea group compound. A particularly desirable urea group compound may be urea or thiourea. As amine group compounds, an aliphatic amine such as methyl amine, ethylamine, propylamine, isopropylamine, butylamine, amylamine or the like, benzylamine, furfuryl amine, ethanol amine, ethylenediamine, hexamethylenediamine hexamethylenetetramine, or the like, as well as ammonia are illustrated, and said amine group compound is used singly or two or more amine group compounds may be used together. The formaldehyde group compound(s) used for the production of said alkylol triazone derivative is (are) the same as the formaldehyde group compound(s) used for the production of said phenol group resin precondensate.

To synthesize said alkylol triazone derivatives, commonly 0.1 to 1.2 moles of said amine group compound(s) and/or ammonia, and 1.5 to 4.0 moles of said formaldehyde group compound are reacted with 1 mole of said urea group compound. In said reaction, the order in which said compounds are added is arbitrary, but preferably, the required amount of formaldehyde group compound is put in a reactor first, after which the required amount of amine group compound(s) and/or ammonia is (are) gradually added to said formaldehyde group compound, the temperature being kept at below 60° C., after which the required amount of said urea group compound(s) is (are) added to the resulting mixture at 80 to 90° C. for 2 to 3 hours, being agitated so as to react together. Usually, 37% by mass of formalin is used as said formaldehyde group compound, but some of said formalin may be replaced with paraformaldehyde to increase the concentration of the reaction product. Further, in a case where hexamethylene tetramine is used, the solid content of the reaction product obtained is much higher. The reaction between said urea group compound, amine group compound and/or ammonia, and said formaldehyde group compound is commonly performed in a water solution, but said water may be partially or wholly replaced with one or more kinds of alcohol such as methanol, ethanol, isopropanol, n-butanol, ethylene glycol, diethylene glycol, or the like, and one or more kinds of other water soluble organic solvent such as ketone group solvent like acetone, methylethyl ketone, or the like can also be used as solvents. The amount of said curing agent to be added is, in the case of a formaldehyde group compound, in the range of between 10 and 100 parts by mass to 100 parts by mass of said phenol group resin precondensate (precocondensation polymer) of the present invention, and in the case of alkylol triazone, derivative, 10 to 500 parts by mass to 100 parts by mass of said phenol group resin precondensate (precocondensation polymer).

[Sulfomethylation and/or Sulfimethylation of Phenol Group Resin]

To improve the stability of said water soluble phenol group resin, said phenol group resin is preferably sulfomethylated and/or sulfimethylated.

[Sulfomethylation Agent]

The sulfomethylation agents used to improve the stability of the aqueous solution of phenol group resins, include such as water soluble sulfites prepared by the reaction between sulfurous acid, bisulfurous acid, or metabisulfirous acid, and alkaline metals, trimethyl amine, quaternary amine or quaternary ammonium (e.g. benzyltrimethylammonium); and aldehyde additions prepared by the reaction between said water soluble sulfites and aldehydes.

The aldehyde additives are prepared by the addition reaction between said aldehydes and water soluble sulfites as aforementioned, wherein the aldehydes include formaldehyde, acetoaldehyde, propionaldehyde, chloral, furfural, glyoxal, n-butylaldehyde, caproaldehyde, allylaldehyde, benzaldehyde, crotonaldehyde, acrolein, phenyl acetoaldehyde, o-tolualdehyde, salicylaldehyde, or the like. For example, hydroxymethane sulfonate, which is one of the aldehyde additives, is prepared by the addition reaction between formaldehyde and sulfite.

[Sulfimethylation Agent]

The sulfimethylation agents used to improve the stability of the aqueous solution of phenol group resins, include alkaline metal sulfoxylates of an aliphatic or aromatic aldehyde such as sodium formaldehyde sulfoxylate (a.k.a. Rongalite), sodium benzaldehyde sulfoxylate, or the like; hydrosulfites (a.k.a. dithionites) of alkaline metal or alkaline earth metal such as sodium hydrosulfite, magnesium hydrosulfite, or the like; and a hydroxyalkanesulfinate such as hydroxymethanesulfinate, or the like.

In a case where said phenol group resin precondensate is sulfomethylated and/or sulfimethylated, said sulfomethylation agent and/or sulfimethylation agent is(are) added to said precondensate at any stage to sulfomethylate and/or sulfimethylate said phenol group compound and/or said precondensate.

The addition of said sulfomethylation agent and/or sulfimethylation agent may be carried out at any stage, before, during or after the condensation reaction.

The total amount of said sulfomethylation agent and/or sulfimethylation agent to be added is in the range of between 0.001 and 1.5 moles per 1 mole of said phenol group compound. In a case where the total amount of said sulfomethylation agent and/or sulfimethylation agent to be added is less than 0.001 mole per 1 mole of said phenol group compound, the resulting phenol group resin will have an insufficient hydrophilic property, while in a case where the total amount of said sulfomethylation agent and/or sulfimethylation agent to be added is beyond 1.5 moles per 1 mole of said phenol group compound, the resulting phenol group resin will have insufficient water resistance. To maintain good performance, in such as the curing capability of said produced precondensate, and the properties of the resin after curing, or the like, the total amount of said sulfomethylation agent and/or sulfimethylation agent is preferably set to be in the range of between about 0.01 and 0.8 mole for said phenol group compound.

Said sulfomethylation agent and/or sulfimethylation agent added to said precondensate, to effect the sulfomethylation and/or sulfimethylation of said precondensate, react(s) with the methylol group of said precondensate, and/or the aromatic group of said precondensate, introducing a sulfomethyl group and/or sulfimethyl group to said precondensate.

As aforementioned, an aqueous solution of sulfomethylated and/or sulfimethylated phenol group resin precondensate is stable in a wide range, between acidity (pH1.0), and alkalinity, with said precondensate being curable within any range, acidity, neutrality, or alkalinity. In particular, in a case where said precondensate is cured in an acidic range, the remaining amount of said methylol group decreases, solving the problem of formaldehyde being produced by the decomposition of said cured precondensate.

[Flame Retardant Agent]

Further, a flame retardant may be added to at least any of said fiber sheet, stretched paper, or air permeable porous material. Said flame retardant is, for instance, such as flame retardant containing phosphorus, flame retardant containing nitrogen, flame retardant containing sulfur, flame retardant containing boron, flame retardant containing bromine, guanidine group flame retardant, phosphate group flame retardant, phosphoric ester flame retardant, amine resin group flame retardant, expandable graphite, or the like.

A powdery flame retardant, which is insoluble or difficult to dissolve in water, is especially advantageously when used in the present invention.

Said powdery flame retardant, which is insoluble or difficult to dissolve in water, imparts a flame retardancy having excellent water resistance and durability to said sound absorbing surface material and sound absorbing material. In particular, since said fiber sheet and air permeable porous material of the present invention have a thin structure, said powdery solid flame retardant can be smoothly impregnated into the inside of said fiber sheet and air permeable porous material, so that said fiber sheet and air permeable porous material gain high flame retardancy to non-flamability.

Further, in a case where a flame retardant fiber or flame proofing fiber, for instance, an inorganic fiber such as carbon fiber, glass fiber, ceramic fiber, or the like, a mineral fiber such as asbestos fiber, or the like, an aramid fiber (aromatic polyamide fiber), animal hair such as sheep wool (natural wool), or the like is used as the material of said fiber sheet or air permeable porous material, said sound absorbing surface material and sound absorbing material can acquire flame retardancy or flame-proofness without using the flame retardant described later.

Into said synthetic resin used in the present invention, further, an inorganic filler, such as calcium carbonate, magnesium carbonate, barium sulfate, calcium sulfate, calcium sulfite, calcium phosphate, calcium hydroxide, magnesium hydroxide, aluminium hydroxide, magnesium oxide, titanium oxide, iron oxide, zinc oxide, alumina, silica, diatomaceous earth, dolomite, gypsum, talc, clay, asbestos, mica, calcium silicate, bentonite, white carbon, carbon black, iron powder, aluminum powder, glass powder, stone powder, blast furnace slag, fly ash, cement, zirconia powder, or the like; a natural rubber or its derivative; a synthetic rubber such as styrene-butadiene rubber, acrylonitrile-butadiene rubber, chloroprene rubber, ethylene-propylene rubber, isoprene rubber, isoprene-isobutylene rubber, or the like; a water-soluble macromolecule and natural gum such as polyvinyl alcohol, sodium alginate, starch, starch derivative, glue, gelatin, powdered blood, methyl cellulose, carboxy methyl cellulose, hydroxy ethyl cellulose, polyacrylate, polyacrylamide, or the like; an organic filler such as, wood flour, walnut powder, coconut shell flour, wheat flour, rice flour, or the like; a higher fatty acid such as stearic acid, palmitic acid, or the like; a fatty alcohol such as palmityl alcohol, stearyl alcohol, or the like; a fatty acid ester such as butyryl stearate, glycerin mono stearate, or the like; a fatty acid amide; a natural wax or composition wax such as carnauba wax, or the like; a mold release agent such as paraffin, paraffin oil, silicone oil, silicone resin, fluorocarbon polymers, polyvinyl alcohol, grease, or the like; an organic blowing agent such as azodicarbonamido, dinitroso pentamethylene tetramine, p,p'-oxibis(benzene sulfonylhydrazide), azobis-2,2'-(2-methylpropionitrile), or the like; an inorganic blowing agent such as sodium bicarbonate, potassium bicarbonate, ammonium bicarbonate or the like; hollow particles such as shirasu balloon, perlite, glass balloon, plastic foaming glass, hollow ceramics, or the like; foaming bodies or particles such as foaming polyethylene, foaming polystyrene, foaming polypropylene, or the like; a pigment; dye; antioxidant; antistatic agent; crystallizer; a flame retardant such as phosphorus group compound, nitrogen group compound, sulfur group compound, boron group compound, bromine group compound, guanidine group compound, phosphate group compound, phosphoric ester group compound, amine group resin, or the like; flameproofing agent; water-repellent agent; oil-repellent agent; insecticide agent; preservative; wax; surfactant; lubricant; antioxidant; ultraviolet absorber; a plasticizer such as phthalic ester (ex. dibutyl phthalate (DBP), dioctyl phthalate (DOP), dicyclohexyl phthalate) and others (ex. tricresyl phosphate), may be added or mixed.

[Colloidal Silica]

The colloidal silica used in the present invention is minute particle silica or alumina coated minute particle silica, with the average particle size of said colloidal silica generally being in the range of between 1 and 100 μm, but preferably 3 and 50 μm. Said colloidal silica is generally provided as a dispersion in which said colloidal silica is dispersed in water. In a case where the average particle size of said minute particle silica is beyond 100 μm, it is feared that the resin oozing layer will become whitish, and in a case where the average particle size of said minute particle silica is under 1 μm, the surface area of said minute particle silica will expand excessively and negatively influence the stability of the dispersion.

A water and oil repellant agent of the present invention include such as natural wax, synthetic wax, fluorocarbon resin, silicon group resin, or the like.

To impregnate said thermoplastic resin compound into said fiber sheet, said fiber sheet is generally impregnated with a water emulsion or water dispersion of said resin compound, or said water emulsion or water dispersion is coated onto said fiber sheet using a knife coater, roll coater, flow coater, or the like. To adjust the amount of said resin compound in said fiber sheet into which said resin compound is impregnated or mixed, after said resin compound is impregnated or coated in/on to said porous material, said porous material is then squeezed using a squeezing roll, press machine, or the like.

In this case, the thickness of said fiber sheet is reduced, and in a case where said fiber sheet consists of, or contains a low melting point fiber, it is desirable to heat said fiber sheet, so as to melt said low melting point fiber, and bind the fibers with said melted fiber, before said thermoplastic resin is impregnated into said fiber sheet. By doing so, the rigidity and strength of said fiber sheet is further improved, so that the workability of said fiber sheet during the process of impregnating it with said synthetic resin also will be improved, resulting in a remarkable restoration of the thickness of said fiber sheet after squeezing.

After said thermoplastic resin is impregnated or coated in/on to said fiber sheet, said fiber sheet is then dried at room temperature or by heating, to produce a thermoplastic sheet.

As aforementioned, a thermoplastic fiber having a low melting point may be used in said fiber sheet, in this case, since said fiber sheet itself has thermoplasticity, it is not always necessary to impregnate or coat said thermoplastic resin in/on to said fiber sheet.

The present invention is concretely described by the following EXAMPLES. However, the scope of the present invention is not limited by said EXAMPLES.

EXAMPLE 1

A hotmelt adhesive made of a polyamide (melting point: 130° C.) was melted and spray coated onto the backside of a fiber sheet made of a polyester fiber and manufactured by the needle punching method, the unit weight of said fiber sheet being 80 g/m², with the coating amount of said hotmelt adhesive being adjusted to be 15 g/m². Following this, a creped paper made from 60% by mass of conifer pulp and 40% by mass of broad leaf tree pulp was laminated onto the backside of said fiber sheet onto which said hotmelt adhesive was coated, and the resulting laminated sheet was pressure welded with a heat roll, the surface temperature of which was adjusted to be in the range of between 140 and 150° C. Following this, said laminated sheet was pressure welded again with a cooling roll, to obtain a sound absorbing surface material made of said laminated sheet consisting of said creped paper and said fiber sheet. The following four kinds of creped paper were used to prepare the samples of said sound absorbing surface material.
  1. Creping degree: 15%, unit weight: 15 g/m²
  2. Creping degree: 15%, unit weight: 40 g/m²
  3. Creping degree: 30%, unit weight: 15 g/m²
  4. Creping degree: 30%, unit weight: 40 g/m²

Next, a felt made of a polyester fiber, containing 30% by mass of a core-sheath type composite polyester fiber having a low melting point of 160° C., said felt having a unit weight of 600 g/m², and thickness of 15 mm, was used as an air-permeable porous material. A hotmelt adhesive was spray coated onto one side of said felt, the coating amount being adjusted to be 15 g/m². Each sample of said sound absorbing surface material was then put onto said felt, each of the creped paper of said sound absorbing surface material coming into contact with the hotmelt adhesive coated layer of said felt, after which the resulting laminated material was heated in a heating oven, the temperature of which was adjusted to be 200° C. for 50 seconds, following which each laminated material was then molded into a predetermined shape by cold pressing, to obtain samples of sound absorbing material. At the same time, a panel shaped sample, having a thickness of 10 mm, was also molded from said laminated material for a sound absorbing performance test.

EXAMPLE 2

A sound absorbing surface material and a sound absorbing material samples were manufactured in the same manner as EXAMPLE 1, with the exception that an embossed paper was used instead of creped paper. Further, a panel shaped sample having a thickness of 10 mm was also molded for a sound absorbing performance test in the same manner as EXAMPLE 1. The following four kinds of said embossed paper were used to prepare samples of said sound absorbing surface material.
  1. Height of projections: 0.2 mm, number of projections 150 projections/cm², unit weight: 15 g/m².
  2. Height of projections: 0.2 mm, number of projections 150 projections/cm², unit weight: 40 g/m².
  3. Height of projections: 1.5 mm, number of projections 20 projections/m², unit weight: 15 g/m².
  4. Height of projections: 1.5 mm, number of projections 20 projections/m², unit weight: 40 g/m².

COMPARISON 1

The samples of a panel shaped molded material for the sound absorbing performance test were each molded in the same manner as EXAMPLE 1, with the exception that two kinds of creped paper, having creping degrees of 5% and 55% respectively, were used.

COMPARISON 2

For the sound absorbing performance test, samples of said panel shaped molded material were each molded in the same manner as EXAMPLE 1, with the exception that two kinds of creped paper, having unit weights of 8 g/m² and 55 g/m² respectively, were used.

COMPARISON 3

A green paper having a flat and smooth surface before being creped was used instead of said creped paper in EXAMPLE 1. Two kinds of green paper having unit weights of 15 g/m² and 40 g/m² respectively were used, and samples of said panel shaped molded material for the sound absorbing performance test were prepared in the same manner as EXAMPLE 1.

COMPARISON 4

The samples of said panel shaped molded material for the sound absorbing performance test were prepared in the same manner as EXAMPLE 2, with the exception that two kinds of embossed paper, with projection heights being 0.01 mm and 2.5 mm respectively, were used.

COMPARISON 5

The samples of said panel shaped molded material for the sound absorbing performance test were prepared in the same manner as EXAMPLE 2, with the exception that two kinds of embossed paper, with projection heights being 0.2 mm and 1.5 mm, and the number of projections being 250 and 10 projections/cm² respectively, were used.

COMPARISON 6

The samples of panel shaped molded material for the sound absorbing performance test were prepared in the same manner as EXAMPLE 2, with the exception that two kinds of embossed paper, unit weights being 8 g/m² and 55 g/m² respectively, were used.

The results of the sound absorbing performance test and the moldability test of each sample of EXAMPLES 1 and 2, and COMPARISONS 1 to 6 are shown in Tables 1 to 3. However, in Tables 2, 3 and 5, the column 'ventilation resistance of the sound absorbing surface material', means 'the ventilation resistance of the sound absorbing surface material wherein said air permeable porous material was removed from said sound absorbing material.'

TABLE 1

| | | | EXAMPLE 1 | | | | EXAMPLE 2 | | | |
|---|---|---|---|---|---|---|---|---|---|---|
| | | | Sample | | | | | | | |
| | | | 1 | 2 | 3 | 4 | 5 | 6 | 7 | 8 |
| Creped paper | Creping degree | | 15 | 15 | 30 | 30 | | | | |
| | unit weight | | 15 | 40 | 15 | 40 | | | | |
| Embossed paper | height of projection | | | | | | 0.2 | 0.2 | 1.5 | 1.5 |
| | number of projection | | | | | | 150 | 150 | 20 | 20 |
| | unit weight | | | | | | 15 | 40 | 15 | 40 |
| unit weight of felt | | | 600 | 600 | 600 | 600 | 600 | 600 | 600 | 600 |
| Ventilation resistance of sound absorbing surface material | | | 0.23 | 0.26 | 0.24 | 0.37 | 0.31 | 0.33 | 0.14 | 0.16 |
| Ventilation resistance of sound absorbing material | | | 0.54 | 0.56 | 0.55 | 0.6 | 0.6 | 0.63 | 0.59 | 0.61 |
| | | Frequency (Hz) | | | | | | | | |
| Sound absorptivity | | 200 | 0.8 | 1.0 | 0.9 | 1.0 | 1.1 | 1.0 | 0.8 | 1.0 |
| | | 400 | 1.0 | 1.3 | 1.0 | 1.2 | 1.2 | 1.2 | 1.2 | 1.2 |
| | | 500 | 7.3 | 8.0 | 7.4 | 8.2 | 8.3 | 8.3 | 7.0 | 7.5 |
| | | 630 | 12.5 | 15.2 | 13.0 | 15.1 | 15.0 | 15.0 | 11.8 | 11.9 |
| | | 800 | 19.0 | 23.0 | 20.1 | 22.4 | 20.4 | 22.1 | 18.0 | 19.0 |
| | | 1000 | 24.3 | 32.1 | 25.8 | 30.0 | 25.0 | 29.6 | 24.0 | 23.8 |
| | | 1250 | 38.0 | 42.5 | 38.3 | 42.1 | 34.9 | 41.6 | 37.5 | 38.0 |
| | | 1600 | 46.3 | 55.8 | 47.5 | 55.5 | 47.2 | 54.7 | 45.0 | 45.1 |
| | | 2000 | 59.9 | 68.0 | 62.4 | 67.9 | 62.0 | 67.0 | 58.8 | 58.8 |
| | | 2500 | 74.2 | 80.1 | 76.0 | 80.3 | 75.8 | 80.0 | 72.4 | 73.1 |
| | | 3150 | 86.0 | 90.0 | 88.5 | 91.0 | 88.3 | 90.1 | 85.0 | 85.0 |
| | | 4000 | 91.6 | 94.3 | 92.5 | 95.0 | 92.0 | 94.0 | 90.2 | 90.9 |
| | | 5000 | 92.5 | 95.2 | 93.1 | 95.8 | 93.0 | 94.3 | 91.9 | 92.0 |
| | | 6300 | 93.0 | 96.1 | 94.2 | 96.0 | 93.3 | 94.5 | 92.3 | 92.4 |
| moldability | | | ⊚ | ⊚ | ⊚ | ⊚ | ⊚ | ⊚ | ⊚ | ⊚ |
| weight of molded product | | | 725 | 750 | 725 | 750 | 725 | 750 | 725 | 750 |

TABLE 2

| | | | COMPARISON 1 | | | | COMPARISON 2 | | | | COMPARISON 3 | |
|---|---|---|---|---|---|---|---|---|---|---|---|---|
| | | | Sample | | | | | | | | | |
| | | | 9 | 10 | 11 | 12 | 13 | 14 | 15 | 16 | 17 | 18 |
| Creped paper | Creping degree | | 5 | 5 | 55 | 55 | 15 | 15 | 30 | 30 | | |
| | unit weight | | 15 | 40 | 15 | 40 | 8 | 55 | 8 | 55 | | |
| Flat paper | unit weight | | | | | | | | | | 15 | 40 |
| unit weight of felt | | | 600 | 600 | 600 | 600 | 600 | 600 | 600 | 600 | 600 | 600 |
| Ventilation resistance of sound absorbing surface material | | | 0.22 | 0.27 | 0.24 | 0.36 | 0.17 | 0.23 | 0.29 | 0.35 | 0.28 | 0.31 |
| Ventilation resistance of sound absorbing material | | | 0.52 | 0.55 | 0.53 | 0.59 | 0.48 | 0.52 | 0.56 | 0.65 | 0.55 | 0.58 |
| | | Frequency (Hz) | | | | | | | | | | |
| Sound absorptivity | | 200 | 1.0 | 0.8 | 1.0 | 1.0 | 0.8 | 1.0 | 1.0 | 1.0 | 1.0 | 1.1 |
| | | 400 | 1.1 | 1.1 | 1.1 | 1.2 | 1.0 | 1.2 | 1.1 | 1.2 | 1.0 | 1.2 |
| | | 500 | 4.2 | 4.2 | 7.5 | 7.8 | 7.0 | 7.3 | 7.9 | 8.2 | 4.3 | 4.3 |
| | | 630 | 8.3 | 8.4 | 14.3 | 15.5 | 9.1 | 13.2 | 9.3 | 15.0 | 8.2 | 8.3 |
| | | 800 | 11.9 | 12.0 | 20.0 | 21.5 | 15.0 | 20.5 | 16.1 | 21.4 | 11.8 | 11.9 |
| | | 1000 | 18.1 | 18.3 | 27.1 | 30.0 | 20.1 | 28.0 | 21.4 | 30.0 | 18.0 | 18.2 |
| | | 1250 | 22.3 | 22.5 | 38.6 | 41.6 | 27.8 | 40.5 | 28.8 | 41.8 | 22.1 | 22.2 |
| | | 1600 | 30.9 | 29.9 | 49.1 | 55.8 | 38.1 | 52.1 | 39.9 | 54.7 | 30.0 | 30.3 |
| | | 2000 | 38.3 | 38.4 | 60.6 | 65.1 | 45.6 | 63.3 | 46.2 | 66.0 | 37.4 | 37.5 |
| | | 2500 | 49.3 | 49.8 | 73.5 | 78.0 | 58.6 | 78.9 | 59.7 | 79.1 | 48.1 | 48.3 |
| | | 3150 | 61.2 | 61.5 | 86.7 | 89.1 | 69.3 | 90.0 | 70.3 | 90.3 | 60.0 | 59.9 |

TABLE 2-continued

| | | COMPARISON 1 | | | | COMPARISON 2 | | | | COMPARISON 3 | |
|---|---|---|---|---|---|---|---|---|---|---|---|
| | | Sample | | | | | | | | | |
| | | 9 | 10 | 11 | 12 | 13 | 14 | 15 | 16 | 17 | 18 |
| | 4000 | 73.7 | 73.8 | 90.1 | 92.2 | 77.7 | 91.5 | 78.8 | 94.2 | 72.3 | 72.5 |
| | 5000 | 85.7 | 86.0 | 90.3 | 92.6 | 85.4 | 91.8 | 86.6 | 94.8 | 84.1 | 84.2 |
| | 6300 | 86.2 | 86.2 | 90.5 | 92.5 | 86.4 | 91.7 | 87.0 | 94.9 | 84.3 | 84.5 |
| moldability | | ▲ | ▲ | Δ | Δ | ▲ | Δ | ▲ | Δ | ▲ | ▲ |
| weight of molded product | | 725 | 750 | 725 | 750 | 718 | 765 | 718 | 765 | 725 | 750 |

TABLE 3

| | | COMPARISON 4 | | | | COMPARISON 5 | | | | COMPARISON 6 | | | |
|---|---|---|---|---|---|---|---|---|---|---|---|---|---|
| | | Sample | | | | | | | | | | | |
| | | 19 | 20 | 21 | 22 | 23 | 24 | 25 | 26 | 27 | 28 | 29 | 30 |
| Embossed paper | height of projection | 0.01 | 0.01 | 2.5 | 2.5 | 0.2 | 0.2 | 1.5 | 1.5 | 0.2 | 0.2 | 1.5 | 1.5 |
| | number of projection | 150 | 150 | 20 | 20 | 250 | 250 | 10 | 10 | 150 | 150 | 20 | 20 |
| | unit weight | 15 | 40 | 15 | 40 | 15 | 40 | 15 | 40 | 8 | 55 | 8 | 55 |
| unit weight of felt | | 600 | 600 | 600 | 600 | 600 | 600 | 600 | 600 | 600 | 600 | 600 | 600 |
| Ventilation resistance of sound absorbing surface material | | 0.21 | 0.24 | 0.25 | 0.27 | 0.21 | 0.25 | 0.24 | 0.28 | 0.13 | 0.30 | 0.14 | 0.31 |
| Ventilation resistance of sound absorbing material | | 0.55 | 0.56 | 0.51 | 0.53 | 0.53 | 0.56 | 0.46 | 0.51 | 0.42 | 0.52 | 0.42 | 0.55 |
| | Frequency (Hz) | | | | | | | | | | | | |
| Sound absorptivity | 200 | 1.0 | 0.9 | 1.0 | 1.0 | 0.8 | 1.0 | 1.0 | 1.0 | 0.8 | 1.0 | 1.0 | 0.8 |
| | 400 | 1.2 | 1.0 | 1.1 | 1.2 | 1.0 | 1.2 | 1.1 | 1.0 | 1.0 | 1.1 | 1.1 | 1.0 |
| | 500 | 5.4 | 5.5 | 6.9 | 6.8 | 5.5 | 5.6 | 5.3 | 5.5 | 5.0 | 6.9 | 5.1 | 6.8 |
| | 630 | 8.8 | 8.9 | 10.1 | 10.3 | 8.9 | 9.4 | 8.8 | 9.0 | 8.3 | 10.4 | 8.2 | 10.3 |
| | 800 | 12.3 | 12.5 | 17.5 | 17.7 | 12.7 | 12.9 | 12.0 | 12.1 | 11.1 | 18.0 | 11.1 | 18.1 |
| | 1000 | 19.1 | 20.0 | 23.0 | 23.2 | 19.4 | 20.3 | 19.0 | 19.4 | 18.0 | 23.5 | 18.2 | 22.9 |
| | 1250 | 23.8 | 24.0 | 36.1 | 36.5 | 22.6 | 23.1 | 21.7 | 22.2 | 21.0 | 36.0 | 20.2 | 36.1 |
| | 1600 | 31.2 | 31.8 | 43.2 | 44.0 | 30.2 | 32.7 | 29.4 | 30.0 | 29.7 | 43.9 | 28.8 | 43.3 |
| | 2000 | 39.6 | 40.7 | 56.4 | 56.5 | 38.8 | 39.0 | 38.0 | 38.4 | 37.4 | 56.0 | 37.3 | 56.1 |
| | 2500 | 48.7 | 49.7 | 70.1 | 70.6 | 48.0 | 49.0 | 47.1 | 47.6 | 47.5 | 70.1 | 47.0 | 70.7 |
| | 3150 | 61.7 | 62.3 | 83.9 | 84.4 | 60.3 | 60.5 | 59.0 | 60.7 | 58.9 | 84.6 | 58.8 | 84.9 |
| | 4000 | 75.5 | 76.1 | 88.9 | 89.0 | 74.4 | 75.3 | 73.1 | 74.4 | 73.3 | 90.0 | 73.0 | 90.5 |
| | 5000 | 86.7 | 87.8 | 90.0 | 91.2 | 85.1 | 85.7 | 84.4 | 85.0 | 81.3 | 90.5 | 81.0 | 91.2 |
| | 6300 | 87.2 | 88.8 | 91.1 | 91.3 | 85.4 | 86.0 | 84.7 | 85.6 | 81.4 | 91.0 | 81.2 | 91.6 |
| moldability | | ▲ | ▲ | Δ | Δ | ▲ | ▲ | Δ | Δ | ▲ | Δ | ▲ | Δ |
| weight of molded product | | 725 | 750 | 725 | 750 | 725 | 750 | 725 | 750 | 718 | 765 | 718 | 765 |

Ventilation resistance: According to the method using the Frajour type ventilation degree tester, the ventilation degree tester (KATO TEC CO., KES-F8-AP1) was used to measure the ventilation resistance in a case where the volume of ventilation for the unit area is set to be 4 cc/s·cm² (t=10 mm).

سound absorbing rate: the sound absorbing rate (%) for vertical incidence was measured using a method based on JIS-A1405 (t=10 mm).

Moldability: Moldability was checked regarding each sample, having been molded into predetermined shapes ◎: No wrinkles or tears, and the deep drawing parts were easily molded.

▲: Paper had difficulty meeting the shape of the deep drawing part and tore, the resulting torn part appearing on the surface of the sample sound absorbing material as a line.

Δ: Wrinkles were produced in the flat part, and the deep drawing part.

x: The resin in the sample of said sound absorbing material exuded to the surface of the sample of said sound absorbing material, resulting in inferior appearance.

[Discussion]

Referring to the test results of samples 1 to 8 of EXAMPLES 1 and 2 relating to the present invention, and the samples 9 to 30 of COMPARISONS 1 to 6, in Tables 1 to 3, the following facts were clarified.

By using the stretchable creped or embossed papers, of the present invention, whose characteristics are within the range limited in claims, the vertical incidence sound absorbing rate (%) for each frequency was roughly in the range shown in Table 4.

TABLE 4

| Frequency (Hz) | Sound absorptivity (%) |
|---|---|
| 200 | 0.8~1.1 |
| 400 | 1.0~1.3 |
| 500 | 7.0~8.3 |
| 630 | 11.8~15.2 |
| 800 | 18.0~23.0 |
| 1000 | 23.8~32.1 |
| 1250 | 34.9~42.5 |
| 1600 | 45.0~55.8 |
| 2000 | 58.8~68.0 |
| 2500 | 72.4~80.3 |
| 3150 | 85.0~91.0 |
| 4000 | 90.2~95.0 |

TABLE 4-continued

| Frequency (Hz) | Sound absorptivity (%) |
|---|---|
| 5000 | 91.9~95.8 |
| 6300 | 92.3~96.1 |

The samples, having a small degree of creping, such as samples 9 and 10 in COMPARISON 1, had much inferior sound absorbing rate and moldability as compared to the samples of EXAMPLES 1 and 2.

The samples having a large degree of creping, such as samples 11 and 12, were almost equal in sound absorbing performance as compared to samples of EXAMPLES, but since the creped papers used in samples 11 and 12 had a high degree of creping, noticeable wrinkles were formed on the surface of the molded samples.

Samples 13 and 15, having small unit weights in COMPARISON 2, were inferior in their sound absorbing performance and moldability as compared to the samples of EXAMPLES, while in samples 14 and 16 which had large unit weights, torn wrinkles were observed in the molded sample's deep drawing parts as compared to the samples of EXAMPLES.

In a case where a green paper having a flat and smooth surface was used in COMPARISON 3, although the resulting surface material or sound absorbing material had almost equal ventilation resistance, the sound absorbing rate of said sound absorbing material was inferior. Further, said sound absorbing material had difficulty meeting the deep drawing part during molding, and had inferior moldability.

Samples 19 and 20 of COMPARISON 4 have short projections as compared to the samples of EXAMPLES; samples 19 and 20 had inferior sound absorbing performance and moldability.

Samples 21 and 22 had tall projections, and also had inferior sound absorbing performance and moldability the same as with samples 19 and 20.

Samples 23 and 24 of COMPARISON 5 had too many projections, and had inferior sound absorbing performance and moldability as compared to the samples of EXAMPLES, while samples 25 and 26, having fewer projections, also had inferior sound absorbing performance and moldability.

Samples 27 and 29 of COMPARISON 6, having light unit weights, had inferior sound absorbing performance and moldability as compared to the samples of EXAMPLES, while in samples 28 and 30, which had heavy unit weights, torn wrinkles were observed in the deep drawing parts produced during molding.

Referring to the results described above, it became clear that to obtain a high performance sound absorbing surface material and sound absorbing material, a particular stretchable paper of the present invention is preferably used, because the minute unevenness in the surface of said stretchable paper imparts the preferable sound absorbing performance and moldability. Further, the use of said sound absorbing surface material or sound absorbing material is also advantageous in that the resulting molded product can be of a lighter weight.

EXAMPLE 3

A fiber sheet made of a polyester fiber and having an unit weight of 70 g/m² was prepared by the needle punching molded, and a hotmelt adhesive made of polyester (melting point: 130° C.) was heated, melted and spray coated onto the backside of said fiber sheet, the coating amount being adjusted to be 10 g/m² as a solid. A creped paper made from 80% by mass of conifer pulp, and 20% by mass of broad leaf tree pulp (degree of creping: 30%, unit weight: 20 g/m²) was laminated onto the backside of said fiber sheet onto which said hotmelt adhesive was coated, and the resulting laminated sheet was pressure welded with a heat roll, the surface temperature of which was adjusted to be in the range of between 140 and 150° C., and then pressure molded again with a cooling roll to attach said creped paper to said fiber sheet. Next, a mixture solution containing 40 parts by mass of an acrylic ester/methacrylic ester copolymer emulsion (solid content: 40% by mass, MFT (membrane forming temperature):4° C.), 20 parts by mass of copolymer poxyester resin (melting point: 110° C., particle size: 10~150 μm) as a hotmelt adhesive, and 40 parts by mass of water was then spray coated onto said creped paper attached to said fiber sheet in a coating amount of 18 g/m² as a solid, following which the resulting coated laminated sheet was then dried at 120° C. for 4 minutes, to obtain a sound absorbing surface material. The ventilation resistance of said sound absorbing surface material was 0.63 kPa·s/m.

Next, a fiber web made of a polyester fiber in which 30% by mass of a core-sheath type composite polyester fiber having a low melting point (melting point: 160° C.) was mixed, said fiber web having a unit weight of 600 g/m², and a thickness of 20 mm, was used as an air permeable porous material. Said sound absorbing surface material was put onto one side of said fiber web, after which the resulting laminated material was then heated in a heating oven, the temperature of which was adjusted to be 200° C. for 60 seconds, after which said laminated material was then molded into a predetermined shape by cold pressing, to obtain a sound absorbing material. At the same time, a panel shaped sample having a thickness of 10 mm was also molded from said laminated material for the sound absorbing performance test. The ventilation resistance of said panel type shaped sample was 1.24 kPa·s/m. The results of the sound absorbing rate and moldability of said samples are shown in Table 5.

COMPARISON 7

A sound absorbing material sample was prepared in the same manner as EXAMPLE 3, with the exception that said creped paper was exchanged for a flat green paper (unit weight: 20 g/m²). The ventilation resistance of this surface material was 0.65 kPa·s/m, and that of said sample having a thickness of 10 mm, was 1.26 kPa·s/m. The test results of the sound absorbing rate and moldability of said samples are shown in Table 5.

COMPARISON 8

In EXAMPLE 3, a fiber sheet, made of a polyester fiber, by the needle punching method, and having a unit weight of 70 g/m², was used. A hotmelt adhesive, made of a polyester copolymer (melting point: 130° C.) was melted by heating, and the resulting melted hotmelt adhesive was then spray coated onto one side of said fiber sheet, the coating amount being adjusted to be 10 g/m², to prepare a surface material (ventilation resistance: 0.03 kPa·s/m). Said surface material was laminated onto the following three kinds of fiber web as air permeable porous materials, after which the resulting laminated materials were each heated in a heating oven, the temperature of which was adjusted to be 200° C. for 60 seconds, after which each of said heated laminated materials were molded into predetermined shapes by cold pressing just after heating.

1. A fiber web made of a polyester fiber mixture containing 70% by mass of a polyester fiber, and 30% by mass of a core-sheath type composite polyester fiber having a low melting point (melting point: 160° C.), the unit weight of said fiber web being 600 g/m².
2. A fiber web made of the same polyester fiber mixture, having a unit weight of 900 g/m².
3. A fiber web made of the same polyester fiber mixture, having a unit weight of 1800 g/m².

Further, at the same time, a panel shaped sample, having a thickness of 10 mm was molded from each laminated sample for the sound absorbing performance test. The ventilation resistance of each sample is as follows.
1. Sample using the fiber web having a unit weight of 600 g/m²: 0.38 kPa·s/m Next, a fiber sheet, as an air permeable porous material, made of a polyester fiber mixture consisting of 70% by mass of a polyester fiber and 30% by mass of a core-sheath type composite polyester fiber having a low melting point (melting point: 160° C.) was prepared. The unit weight of said fiber sheet was 900 g/m².

Said surface material was laminated onto said air permeable porous material, and the resulting laminated material was heated in a heating oven, the temperature of which was adjusted to be 200° C. for 60 seconds, after which the heated laminated material was immediately molded into a predetermined shape by cold pressing, to obtain a sample of a sound absorbing material, having a thickness of 10 mm. The ventilation resistance of said sample was 1.30 kPa·s/m. The sound absorbing rate and moldability of said samples are shown in Table 5 (samples 33 to 36).

TABLE 5

| | | EXAMPLE 3 | COMPARISON 7 | COMPARISON 8 | | | COMPARISON 9 |
|---|---|---|---|---|---|---|---|
| | | Sample | | | | | |
| | | 31 | 32 | 33 | 34 | 35 | 36 |
| Ventilation resistance of sound absorbing surface material | | 0.63 | 0.65 | 0.03 | 0.03 | 0.03 | 0.67 |
| Ventilation resistance of sound absorbing material | | 1.24 | 1.26 | 0.38 | 0.56 | 1.28 | 1.30 |
| unit weight of air permeable porous material | | 600 | 600 | 600 | 900 | 1800 | 900 |
| | Frequency (Hz) | | | | | | |
| Sound absorptivity | 200 | 1.0 | 1.0 | 1.0 | 1.0 | 1.0 | 1.0 |
| | 400 | 3.3 | 2.5 | 3.0 | 2.5 | 3.8 | 3.4 |
| | 500 | 9.1 | 5.3 | 5.1 | 5.1 | 7.2 | 7.1 |
| | 630 | 17.3 | 8.4 | 7.1 | 7.3 | 11.4 | 10.5 |
| | 800 | 27.4 | 11.2 | 10.0 | 10.2 | 16.7 | 15.4 |
| | 1000 | 38.0 | 19.4 | 13.3 | 15.6 | 21.2 | 20.5 |
| | 1250 | 47.3 | 25.0 | 18.2 | 21.8 | 31.2 | 31.1 |
| | 1600 | 58.1 | 32.3 | 21.2 | 28.5 | 40.0 | 40.5 |
| | 2000 | 70.0 | 42.7 | 25.6 | 34.7 | 52.7 | 52.6 |
| | 2500 | 81.1 | 56.1 | 30.3 | 42.6 | 69.1 | 68.8 |
| | 3150 | 92.7 | 70.0 | 40.0 | 57.9 | 82.3 | 82.0 |
| | 4000 | 96.1 | 82.2 | 52.7 | 71.7 | 90.1 | 89.9 |
| | 5000 | 96.4 | 90.6 | 62.6 | 82.3 | 91.2 | 90.3 |
| | 6300 | 96.0 | 93.1 | 68.5 | 89.0 | 92.3 | 90.7 |
| moldability | | ◎ | ▲ | ◎ | ◎ | ◎ | X |
| weight of molded product | | 708 | 708 | 680 | 980 | 1880 | 1220 |

2. Sample using the fiber web having a unit weight of 900 g/m²: 0.56 kPa·s/m
3. Sample using the fiber web having a unit weight of 1800 g/m²: 1.28 kPa·s/m The results of the sound absorbing rate and the modability of samples are shown in Table 5.

COMPARISON 9

In EXAMPLE 3, a fiber sheet made of a polyester fiber, by the needle punching method, and having a unit weight of 70 g/m², was used. A mixture solution containing 60 parts by weight of acrylic ester/methacrylic ester copolymer emulsion (solid content: 40% by mass, MFT: 4° C.), 20 parts by mass of a polyester copolymer resin (melting point: 110° C., particle size: 100 to 150 μm) as a hotmelt adhesive, and 20 parts by mass of water, was spray coated onto one side of said fiber sheet in a coating amount of 250 g/m² as a solid, following which the resulting coated fiber sheet was heated, and suction dried at 140° C. for 10 minutes, to obtain a surface material. The ventilation resistance of said surface material was 0.67 kPa·s/m.

[Discussion]

Comparing sample 31 of EXAMPLE 3 and samples 33, 34 and 35 of COMPARISON 8, it is recognized that whole unit weight of the traditional surface material should increase so as to improve its sound absorbing performance. Comparing sample 31 of EXAMPLE 3, and sample 35 of COMPARISON 8, it is recognized that in sample 35, the air permeable porous material, which has a unit weight of 1800 g/m², has the almost the same sound absorbing performance as the air permeable porous material of sample 31 of EXAMPLE 3, which has the unit weight of 600 g/m².

That is, to secure the same sound absorbing performance as the traditional sound absorbing material, the sound absorbing material of the present invention, having only one-third the weight of the traditional sound absorbing material, is adequate to perform this role, and further, has good moldability.

Sample 32 of COMPARISON 7 uses a flat green paper, so that sample 32 has an inferior sound absorbing performance and moldability, although the sound absorbing surface material, and the sound absorbing material of sample 32 each have the same ventilation resistance as that of sample 31 of EXAMPLE 3.

Accordingly it seems that the fine unevenness of said creped paper is effective for a sound absorbing performance.

In sample 36 of COMPARISON 9, to adjust the ventilation resistance to a preferable value, it is necessary to coat a considerable amount of resin onto the fiber sheet, and as a result, when said laminated material is molded, excess resin exudes from the surface of said laminated material, degrading the moldability of said laminated material.

Said sound absorbing material of the present invention is lightweight, has an excellent sound absorbing performance, and is ideal for an automotive roof lining, trunk room mat, floor mat, dash silencer, and the like.

EXAMPLE 4

A fiber sheet made of a polyester fiber, by the spun bonding method, and having a unit weight of 50 g/m² was used. A hotmelt adhesive powder made of a polyamide copolymer (melting point: 120° C., particle size: 200 to 250 μm) was scattered onto the backside of said fiber sheet, the coating amount being adjusted to be 10 g/m² as a solid. An embossed paper made from 50% by mass of conifer pulp and 50% by mass of broad leaf tree pulp (height of projections: 0.10 mm, number of projections: 72 projections/cm², unit weight: 15 g/m²) was laminated onto the backside of said fiber sheet, after which the resulting laminated material was then pressure welded with a heat roll, the surface temperature of which was adjusted to be 140 to 150° C., and then pressure molded again with a cooling roll, to attach said embossed paper to said fiber sheet. Next, a mixture solution containing 87 parts by mass of an acrylic ester/methacrylic ester copolymer emulsion (solid content: 48% by mass, Tg: −40° C., MFT: <0° C.), 10 parts by mass of a phlogopite (particle size: 10 to 15 μm), and 3 parts by mass of a carbon black (water dispersion, 50% by mass) was spray coated onto said laminated material of said embossed paper and said fiber sheet in an amount of 25 g/m² as a solid, after which the resulting coated laminated material was dried by heating at 120° C., to obtain a sound absorbing surface material. Next, using a recycled uncured green felt web into which a novolak type phenolic resin powder with a curing agent was mixed in an amount of 20% by mass (unit weight 50 g/m², thickness: 20 mm) as an air permeable porous material, said sound absorbing surface material was laminated onto one side of said recycled uncured green felt web, after which the resulting laminated material was then molded by hot pressing at 200° C. for 60 seconds into a predetermined shape, to obtain a sound absorbing material.

Said sound absorbing material is lightweight, has an excellent moldability and sound absorbing performance, and is suitable for automotive interiors such as floor mat, room partition, and the like.

EXAMPLE 5

A fiber sheet made of a polyester fiber, by the needle punching method, and having a unit weight of 70 g/m² was used, and a cobweb shaped hotmelt adhesive made of a polyamide copolymer (melting point: 135° C., unit weight: 15 g/m²) was put on the back side of said fiber sheet, and further a creped paper made from 20% by mass of conifer pulp and 80% by mass of broad leaf tree pulp, said creped paper having a unit weight of 20 g/m², was laminated onto said fiber sheet, and the resulting laminated material was then pressure welded with a heat roll, the surface temperature of which was adjusted to be 140 to 150° C., and then pressure welded again with a cooling roll, to attach said creped paper to said fiber sheet. Following which, 40 parts by mass of a resol type phenol formaldehyde precondensation polymer (water solution, solid content 40% by mass), 1 part by mass of a carbon black (water dispersion, solid content 20% by mass), 2 parts by mass of a fluorine group water and oil repellant agent (water solution, solid content: 20% by mass), 10 parts by mass of a phosphorous-nitrogen group flame retardant, and 47 parts by mass of water were mixed to prepare a resin mixture solution, and said resin mixture solution was then coated in an amount of 20 g/m² as a solid, to impregnate said resin mixture solution into said laminated material, after which said laminated material into which said resin mixture was impregnated, was then heated and suction dried at 140° C. for 2 minutes, to precure said resol type phenol-formaldehyde precondensation polymer, and obtain a sound absorbing surface material. Next, an uncured glass wool green web containing 20% by mass of an uncured resol type phenolic resin (unit weight: 450 g/m², thickness: 30 mm) as an air permeable porous material was laminated onto said sound absorbing surface material, after which the resulting laminated material was then molded by hot pressing at 200° C. for one minute into a predetermined shape, to obtain a sound absorbing material. The resulting sound absorbing material is lightweight, has an excellent flame retardant property, and no wrinkles were formed during the molding of said sound absorbing material, so that said sound absorbing material has an excellent appearance, is useful for automotive interiors such as engine under cover, hood silencer, outer dash silencer, and the like.

EXAMPLE 6

A fiber sheet made of 70% by mass of a polyester fiber and 30% by mass of a carbon fiber, by the needle punching method, and having a unit weight of 70 g/m², was used, and a hotmelt adhesive powder made of a nylon copolymer (melting point: 135° C., particle size: 200 to 300 μm) was scattered on the backside of said fiber sheet, the coating amount being adjusted to be 5 g/m².

Following which an embossed and creped paper, made from 90 parts by mass of Manila hemp, and 10 parts by mass of rayon (degree of creping: 35%, height of projections: 0.2 mm, number of projections: 50 projections/cm², unit weight: 15 g/m²) was laminated onto the back side of said fiber sheet, and the resulting laminated material was pressure welded with a heat roll, the surface temperature of which was adjusted to be 140 to 150° C., and then pressure welded again with a cooling roll, to attach said embossed and creped paper to said fiber sheet.

A resin mixture solution containing 40 parts by mass of a sulfomethylated phenol-alkylresorcin-formaldehyde precondensation polymer (water solution, solid content: 45% by mass), 1 part by mass a carbon black (water dispersion, solid content: 20% by mass), 2 parts by mass of a fluorine group water and oil repellant agent, 10 parts by mass of a phosphorus-nitrogen group flame retardant, and 47 parts by mass of water was prepared, after which said resin mixture solution was then coated on and impregnated in to said laminated material, the coating amount being adjusted to be 15 g/m² as a solid.

Further, a water solution containing 30 parts by mass of an acrylic ester/methacrylic ester copolymer emulsion (solid content: 48% by mass, Tg: −40° C., MFT: <0° C.), 10 parts by mass of a hotmelt adhesive made of a polyamide (particle size: 50 to 100 μm, softening point: 130° C.), 20 parts by mass of a phosphorous-nitrogen group flame retardant, 0.3 part by mass of a sodium polyacrylate as a dispersant, and 39.7 parts by mass of water, was prepared, after which said water solution was then spray coated onto said embossed and creped paper side of said laminated material, the coating amount being adjusted to be 10 g/m² as a solid, after which said laminated material onto which said water solution was coated was then dried at 140° C. for 2 minutes, to precure said sulfomethylated phenol-alkylresorcin-formaldehyde precondensation polymer, and obtain a sound absorbing surface material. Next, a pair of said sound absorbing surface materials were laminated onto the both sides of a foamed melamine resin sheet having a unit weight of 250 g/m² and a thickness of 25 mm as an air permeable porous material, after which the resulting laminated material was then molded by hot-pressing at 200° C. for 50 seconds into a predetermined shape, to obtain a sound absorbing material. The resulting sound absorbing material has good weatherability, is lightweight, has an excellent sound absorbing performance and flame retardant property, and further, no wrinkles were formed during the molding of said sound absorbing material, so that said sound absorbing material has an excellent appearance. Said sound absorbing material is useful for automotive interiors such as engine under cover, cylinder head cover, hood silencer, outer dash silencer, fender liner, and the like.

EXAMPLE 7

A fiber sheet made of a polyester fiber, and having a unit weight of 80 g/m², was prepared by the needle punching method. A mixture solution containing 40 parts by mass of a sulfimethylated phenol-alkyl resorcin-formaldehyde precondensation polymer (water solution, solid content: 45% by mass), 1 part by mass of a carbon black (water dispersion, solid content: 20% by mass), 2 parts by mass of a fluorine group water and oil repellant agent (water solution, solid content: 20% by mass), 10 parts by mass of a phosphorous-nitrogen group flame retardant (water solution, solid content: 40% by mass), and 47 parts by mass of water was prepared, after which said mixture solution was then coated on and impregnated in to said fiber sheet, the coating amount being adjusted to be 30 g/m² as a solid. Said fiber sheet into which said mixture solution was impregnated was then the dried at 150° C. for 2 minutes, to precure said precondensation polymer, and then a cobweb shaped hot-melt adhesive made of a polyamide copolymer (melting point: 135° C., unit weight: 15 g/m²) was put onto the back of said fiber sheet. Further, an embossed paper (height of projections: 0.05 mm, number of projections: 225 prjection/cm², unit weight: 25 g/m²) was laminated onto said cobweb shaped hotmelt adhesive of said fiber sheet, and further said cobweb shaped hotmelt adhesive was put onto said embossed paper. A pair of the resulting laminated materials were then laminated onto both sides of a foamed polyurethane sheet having a unit weight of 340 g/m², and thickness of 17 mm, after which resulting laminated material was then molded by hot pressing at 180° C. for 50 seconds into a predetermined shape, to obtain a sound absorbing material. The resulting sound absorbing material has good weatherability, is lightweight, and has an excellent sound absorbing performance and flame retardant property, and further, no wrinkles were foamed during the molding of said sound absorbing material, so that said sound absorbing material has also an excellent appearance. Said sound absorbing material is useful for automotive interiors such engine under cover, cylinder head cover, hood silencer, outer dash silencer, fender liner, and the like.

EXAMPLE 8

A fiber sheet made of 80% by mass of a polyester fiber and 20% by mass of a polypropylene fiber, by the thermal bond method, and having a unit weight of 30 g/m², was used. A cobweb shaped hotmelt adhesive made of a polyester copolymer (melting point: 110° C., unit weight: 15 g/ma²) was put onto the backside of said fiber sheet. Following which an embossed and creped paper, made from 90 parts by mass of Manila hemp and 10 parts by mass of rayon (degree of creping: 45%, height of projections: 0.1 mm, number of projections: 64 projections/cm², unit weight 15 g/ma²) was laminated onto the backside of said fiber sheet onto which said cobweb shaped hotmelt adhesive was applied, after which the resulting laminated material was pressure welded with a heat roll, the surface temperature of which was adjusted to be 140 to 150° C., and then pressure welded again with a cooling roll, and further said cobweb shaped hotmelt adhesive was put on the laminated material, after which said laminated material was heated at 120° C. for 10 seconds, to obtain a sound absorbing surface material.

Next, a fiber web made of a polyester fiber mixture consisting of 70% by mass of polyester fiber and 30% by mass of a core-sheath type composite fiber sheet having a low melting point (melting point: 130° C.) was prepared, as an air permeable material, the unit weight of said fiber web being 300 g/m².

A pair of said sound absorbing surface materials were laminated onto both sides of said fiber web, and then the resulting laminated material was heated at 200° C. for 60 seconds, after which the heated laminated material was molded by cold pressing, to obtain a panel shaped sound absorbing material having a thickness of 5 mm.

Said sound absorbing material has excellent heat insulation properties, and is usable by laminating it to the plywood, plaster board of a building, and the like.

EXAMPLE 9

A fiber sheet made of a polyester fiber, having a unit weight of 80 g/m² was prepared by the needle punching method. A mixture solution containing 30 parts by mass of an acrylic emulsion (solid content: 45% by mass), 5 parts by mass of a colloidal silica (water solution: silicic acid anhydride content: 20% by mass), and 65 parts by mass of water was coated on and impregnated in to said fiber sheet, the coating amount being adjusted to be 30 g/m² as a solid, after which said fiber sheet into which said mixture solution was impregnated, was then dried at 120° C. for 2 minutes to precure. Next, a cobweb shaped hotmelt adhesive made of a polyamide copolymer (melting point: 110° C., unit weight 15 g/m²) was put onto the backside of said fiber sheet.

A creped paper made from 80% by mass of conifer pulp, and 20% by mass of broad leaf tree pulp (degree of creping: 30%, unit weight 20 g/m²) was laminated onto said cobweb shaped hotmelt adhesive of said fiber sheet, after which the resulting laminated material was pressure welded with a heat roll, the surface temperature of which was adjusted to be 120 to 125° C., and then pressure welded again with a cooling roll, to attach said creped paper to said fiber sheet. Next, a mixture solution containing 40 parts by mass of an acrylic ester/methacrylic ester copolymer emulsion (solid content: 40 parts by mass, MFT: 4° C.), 20 parts by mass of a polyamide copolymer (melting point: 110° C., particle size: 100 to 150 μm) as a hotmelt adhesive, and 40 parts by mass of water was prepared, after which said mixture solution was spray coated onto said creped paper side of the resulting laminated material of said fiber sheet and said creped paper, in an amount of 18 g/m² as a solid, after which said laminated material was dried at 120° C. for 4 minutes, to obtain a sound absorbing surface material.

Next, a recycled uncured green felt web (unit weight: 500 g/m², thickness: 20 mm) to which 20% by mass of an uncured novalak type phenolic resin powder with a curing agent was added, was used as an air permeable porous material, and said sound absorbing surface material was laminated onto one side of said air permeable porous material, and the resulting laminated material of said sound absorbing surface material and said air permeable porous material was then molded by hot pressing at 200° C. for 60 seconds into a predetermined shape, to obtain a sound absorbing material. The resulting sound absorbing material is lightweight, has an excellent moldability, sound absorbing performance, and flame retardant poperty, and further no wrinkles were formed during the molding of said sound absorbing material, so that said sound absorbing material has an excellent appearance. Said sound absorbing material is useful for automotive interiors such as engine under cover, cylinder head cover, hood silencer, outer dash silencer, inner dash silencer, fender liner, and the like.

EXAMPLE 10

A fiber web, with a unit weight of 400 g/m², and made of 60% by mass of a kenaf fiber, 15% by mass of a polyester fiber, and 25% by mass of a core-sheath type composite polyester fiber having a low melting point (melting point: 160° C.), was used to prepare an air permeable porous material.

A resin mixture solution containing 40% parts by mass of a sulfomethylated phenol-alkylresorcin-formaldehyde precondensation polymer (water solution, solid content: 45% by mass), 10 parts by mass of a ammonium polyphosphate, and 50 parts by mass of water was prepared, after which said resin mixture solution was then coated on and impregnated in to said fiber web, the coating amount being adjusted to be 200 g/m² as a solid, after which the resulting fiber web into which said resin mixture was impregnated, was then suction dried at 110° C. for 10 minutes, to precure said sulfomethylated phenol-alkylresorcin-formaldehyde precondensation polymer, and obtain an air permeable porous material having a thickness of 20 mm.

Next, said sound absorbing surface material prepared in EXAMPLE 6, was laminated onto said air permeable porous material, after which the resulting laminated material of said sound absorbing surface material and air permeable porous material was molded into a predetermined shape by hot pressing at 200° C. for 50 seconds, to obtain a sound absorbing material. The resulting sound absorbing material has good weatherability, is lightweight, has an excellent sound absorbing performance and flame retardant property, and no wrinkle were formed during the molding of said sound absorbing material, so that said sound absorbing material also has an excellent appearance. Said sound absorbing material is useful for automotive interiors such as engine under cover, cylinder head cover, hood silencer, outer dash silencer, fender liner, and the like.

POSSIBILITY OF INDUSTRIAL USE

Said sound absorbing surface material provided by the present invention is lightweight, has an excellent sound absorbing performance and moldability, so that the present invention can be used industrially. Further, said sound absorbing material using said sound absorbing surface material can be used advantageously in automobiles and the buildings, so that the present invention can be used industrially.

The invention claimed is:

1. A sound absorbing material having a ventilation resistance in the range of between 0.400 and 20,000 kPa·s/m comprising a sound absorbing surface material having a ventilation resistance in the range of between 0.100 and 1.000 kPa·s/m and an air-permeable porous material sheet laminated onto said sound absorbing surface material, wherein said sound absorbing surface material comprises air-permeable stretchable paper having a ventilation resistance higher than at least 0.060 kPa·s/m and a unit weight in the range of between 10 and 50 g/m², laminated onto one or both sides of a fiber sheet and interposed between the fiber sheet and the air-permeable porous material sheet, so that the ventilation resistance of said sound absorbing surface material, and thus said sound absorbing material, is adjusted by said stretchable paper.

2. A sound absorbing material in accordance with claim 1, wherein a synthetic resin is coated on or impregnated in to at least any of said fiber sheet, stretchable paper, or air permeable porous material sheet to adjust the ventilation resistance.

3. A sound absorbing material in accordance with claim 1, wherein said sound absorbing material is molded into a predetermined shape.

4. A sound absorbing material in accordance with claim 1, wherein said paper is laminated onto said fiber sheet through at least one porous adhesive layer.

5. A sound absorbing material in accordance with claim 1, wherein said stretchable paper is creped paper or embossed paper, or creped and embossed paper wherein degree of crepe is in the range of between 10 and 50% and projections of embossing are in the range of between 20 and 200 projections/cm².

6. A sound absorbing material in accordance with claim 5, wherein a synthetic resin is coated on or impregnated in to at least any of said fiber sheet, stretchable paper, or air permeable porous material sheet to adjust the ventilation resistance.

7. A sound absorbing material in accordance with claim 5, wherein said sound absorbing material is molded into a predetermined shape.

8. A sound absorbing material in accordance with claim 2, wherein said sound absorbing material is molded into a predetermined shape.

9. A sound absorbing material in accordance with claim 6, wherein said sound absorbing material is molded into a predetermined shape.

10. A sound absorbing material in accordance with claim 5, wherein said paper is laminated onto said fiber sheet through at least one porous adhesive layer.

11. A sound absorbing material in accordance with claim 2, wherein said paper is laminated onto said fiber sheet through at least one porous adhesive layer.

12. A sound absorbing material in accordance with claim 6, wherein said paper is laminated onto said fiber sheet through at least one porous adhesive layer.

13. A sound absorbing material in accordance with claim 3, wherein said paper is laminated onto said fiber sheet through at least one porous adhesive layer.

14. A sound absorbing material in accordance with claim 7, wherein said paper is laminated onto said fiber sheet through at least one porous adhesive layer.

15. A sound absorbing material in accordance with claim 8, wherein said paper is laminated onto said fiber sheet through at least one porous adhesive layer.

16. A sound absorbing material in accordance with claim 9, wherein said paper is laminated onto said fiber sheet through at least one porous adhesive layer.

* * * * *